Patented Nov. 28, 1922.

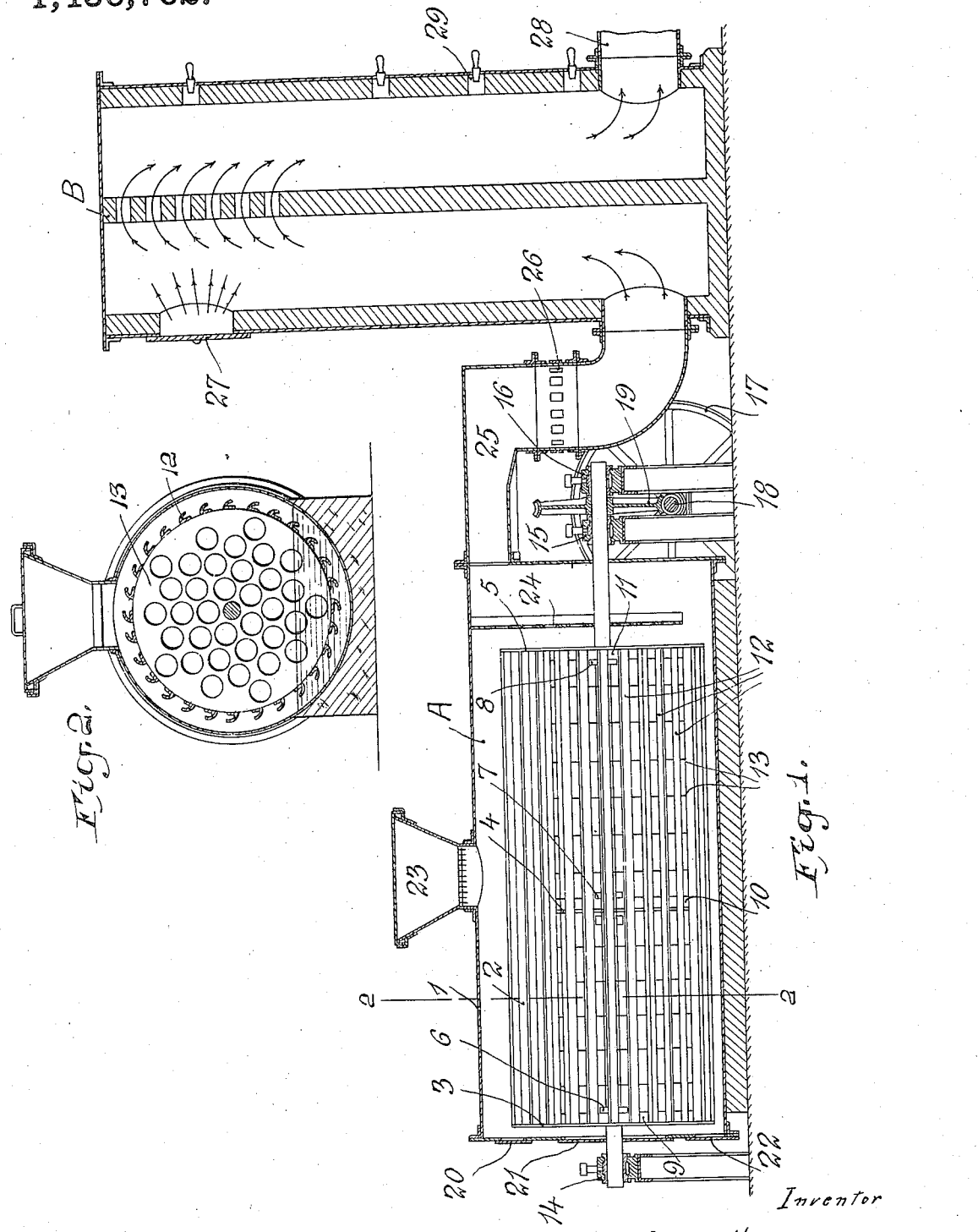

1,436,762

UNITED STATES PATENT OFFICE.

ARTHUR HANSEN, OF SKOTSELVEN, NORWAY.

SULPHUR-COMBUSTION FURNACE.

Application filed July 1, 1921. Serial No. 481,914.

*To all whom it may concern:*

Be it known that I, ARTHUR HANSEN, a subject of the King of Norway, residing at Skotselven, Norway, have invented certain new and useful Improvements in Sulphur-Combustion Furnaces; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object to provide a sulphur furnace comprising a vessel provided with a rotatable rib drum partly immersed in the molten sulphur so that it acts to carry the molten sulphur into intimate contact with the combustion air.

The invention is illustrated in the accompanying drawings, in which—

Fig. 1 is a longitudinal sectional view of a furnace constructed according to the invention, certain parts being shown in elevation.

Fig. 2 is a transverse vertical sectional view, on an enlarged scale, taken on the line 2—2 of Fig. 1.

The furnace comprises a cylindric vessel 1, in which is mounted a rotating rib drum 2. The said rib drum consists of 3 circular plate discs 3, 4, 5, mounted on 3 hubs 6, 7, 8 on a horizontal rotating shaft and provided with angle iron flanges 9, 10, 11 for fastening longitudinal angle iron 12, forming the ribs of the drum. Between the plates 3, 4 and 5 are mounted a number of circular discs 13. The rotating shaft is mounted in bearings 14, 15, 16 and rotates with a speed of ½ revolutions per minute, driven from pulley 17 by means of worm 18 and wormwheel 19. The drum 1 is provided with an inspection opening 20, openings 21 for supplying air and 22 for cleaning purposes.

During the operation of the furnace the sulphur is filled in the hopper 23, from which it drops into the furnace, where it melts and is taken up by the angle bars 12 and burns by means of the air introduced by suction through opening 21. Plates 13 serve to give the furnace a large combustion or evaporation surface. All these plates as well as plates 3, 4, 5 are provided with a suitable number of holes, so that the gases are not hindered during their passage through the furnace. 24 is a perforated screen, the lower edge of which is immersed in the molten sulphur. The sulphur gases pass through screen 24, passage 25 and enter combustion tower B after having passed auxiliary air valve 26, where uncombusted gases are combusted. Further additional air may be added through opening 27, and the gases escape through tube 28. 29 are inspection holes for controlling the combustion in the tower.

Having now particularly described my invention, what I claim and desire to secure by Letters Patent is:

1. A sulphur combustion furnace comprising a stationary vessel having suitable openings therein for the introduction of the sulphur to be burned and the combustion air, and a rotatable drum in said vessel comprising a plurality of discs mounted in spaced relation on a rotatable shaft, and a plurality of rib members mounted in spaced relation on the peripheries of said discs and extending parallel to said shaft.

2. A combustion furnace as set forth in claim 1, comprising a plurality of perforated discs mounted in spaced relation on said shaft intermediate said first mentioned disc.

3. A combustion furnace as set forth in claim 1, in which said vessel is provided with an outlet opening in one end thereof for the escape of the sulphur gases and in which a perforated baffle plate is arranged in said vessel between said end thereof and the adjacent end of said rotatable drum.

In testimony that I claim the foregoing as my invention, I have signed my name in presence of two subscribing witnesses.

ARTHUR HANSEN.

Witnesses:
MORGAN BUGGE,
NANCY ISLAKSEN.